(12) United States Patent
Korpela

(10) Patent No.: US 6,801,786 B1
(45) Date of Patent: Oct. 5, 2004

(54) METHOD FOR THE CONTROL OF COMMUNICATION AND COMMUNICATIONS SYSTEM

(75) Inventor: Mikko Korpela, Raahe (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/719,586

(22) PCT Filed: May 15, 1999

(86) PCT No.: PCT/FI99/00522

§ 371 (c)(1),
(2), (4) Date: Dec. 14, 2000

(87) PCT Pub. No.: WO99/66742

PCT Pub. Date: Dec. 23, 1999

(30) Foreign Application Priority Data

Jun. 16, 1998 (FI) .................................................. 981398

(51) Int. Cl.⁷ ............................................... H04M 1/00
(52) U.S. Cl. ............................... 455/552.1; 455/426.1; 370/355; 370/356
(58) Field of Search .......................... 455/74, 426, 432, 455/435, 436, 450, 515, 552, 560; 370/355–356

(56) References Cited

U.S. PATENT DOCUMENTS

| | | | | |
|---|---|---|---|---|
| 5,640,686 A | * | 6/1997 | Norimatsu | 455/74 |
| 5,732,359 A | * | 3/1998 | Baranowsky, et al. | 455/552.1 |
| 5,732,360 A | * | 3/1998 | Jarett et al. | 455/552.1 |
| 5,761,623 A | * | 6/1998 | Lupien et al. | 455/552.1 |
| 5,946,634 A | * | 8/1999 | Korpela | 455/552.1 |
| 6,038,439 A | * | 3/2000 | Rune | 455/406 |
| 6,212,390 B1 | * | 4/2001 | Rune | 455/456.6 |

FOREIGN PATENT DOCUMENTS

| | | | | |
|---|---|---|---|---|
| EP | 0 852 448 | | 7/1998 | |
| GB | 2 294 844 | | 5/1996 | |
| US | GB2294844 A | * | 8/1996 | H04Q/7/38 |
| WO | WO 96/21999 | | 7/1996 | |
| WO | WO 96/28947 | | 9/1996 | |
| WO | WO 98/24224 | | 6/1998 | |
| WO | WO 98/30042 | | 7/1998 | |

* cited by examiner

Primary Examiner—William Trost
Assistant Examiner—Stephen D Agosta
(74) Attorney, Agent, or Firm—Pillsbury Winthrop LLP

(57) ABSTRACT

A method for the control of communication and a communication system, in which a terminal device communicates with the opposite end via an access network, using low-level signalling protocols, and via a core network connected to the access network, the core network using high level signalling protocols, whereby one or more core networks are connected to the access network, each core network connected to the access network being given a separate identifier and this identifier being used for routing protocol data units of a high level signalling protocol.

16 Claims, 3 Drawing Sheets

| ID | TYPE OF CN | COUNTRY CODE OF CN | NETWORK CODE OF CN |
|---|---|---|---|
| 1 | 1 UMTS (TYPE 1) | XX1 | YY1 |
| 2 | 1 UMTS (TYPE 1) | XX2 | YY2 |
| 3 | 2 UMTS (TYPE 2) | XX3 | YY3 |

METHOD FOR THE CONTROL OF COMMUNICATION AND COMMUNICATIONS SYSTEM

BACKGROUND OF THE INVENTION

The invention relates to communications systems and especially to communication in a system where a plurality of core networks, possibly incompatible with each other, can be connected to an access network.

Here, a communications system signifies generally a telecommunications system, in which a communication connection may be established by using wired or wireless connection. Wireless communications systems generally signify various kinds of telecommunications systems enabling a personal wireless data transmission when subscribers move within the system. A typical wireless communications system is a Public Land Mobile Network (PLMN). Cordless communications systems also belong to the wireless communications systems.

$1^{st}$ generation mobile systems were analog systems, in which speech or data were transmitted in analog form in the same way as in conventional public switched telephone networks. An example of the $1^{st}$ generation systems is the Nordic Mobile Telephone (NMT). In $2^{nd}$ generation mobile systems, such as the Global System for Mobile communication (GSM), speech and data are transmitted in digital form. Digital mobile systems offer, besides conventional speech transmission, also many other services: short messages, telecopy, data transmission, and so on.

At present, $3^{rd}$ generation mobile systems are being developed, such as Universal Mobile Telecommunications System (UMTS) and Future Public Land Mobile Telecommunication System (FPLMTS), which has later been renamed International Mobile Telecommunication 2000 (IMT-2000). The UMTS is under standardization in the European Telecommunication Standards Institute (ETSI), while the International Telecommunication Union (ITU) standardizes the IMT-2000 system. The basic features of these future systems are very similar. The UMTS, for instance, as all mobile systems, produces wireless data transmission services to mobile users. The system supports roaming, i.e. UMTS users can be reached and they may establish calls anywhere, when they are located within the coverage area of the UMTS.

In present view, the UMTS comprises two or three parts illustrated in FIG. 1: a UMTS Access Network (or UMTS Base Station System, UMTS-BSS) and a Core Network (CN) 2, 3, 4, and 5. Below, the UMTS Access Network is also generally called radio access network. The UMTS Access Network is mainly responsible for matters relating to the radio path, which means that it offers the core network a radio access needed for wireless operation. The core network 2, 3, 4 or 5 is a conventional or future telecommunications network, which is modified to utilize the UMTS Access Network in wireless communication effectively. Telecommunications networks conceivable as suitable core networks are $2^{nd}$ generation mobile systems, such as Global System for Mobile Communication (GSM), Integrated Services Digital Network (ISDN), Broadband Integrated Services Digital Network (B-ISDN), Packet Data Networks (PDN), Asynchronous Transfer Mode (ATM), and so on.

Accordingly, the UMTS Access Network shall make supporting different core networks possible, also those to be developed in the future. Correspondingly, the UTMS Access Networks should make it possible to connect different radio interfaces to a core network (narrowband, broadband, CDMA, TDMA, and so on). In accordance with the present scenario, the functions of the UMTS Access Network are strictly restricted to the radio access functions. Thus, it mainly contains functions for the control of radio resources (handover, paging) and for the control of bearer service (control of radio network service). More complicated functions, such as registers, registration functions and mobility and location management are located in each core network or in service producers connected to each core network, producing different services for UMTS subscribers.

In accordance with UMTS terminology, the whole UMTS Access Network is called a Generic Radio Access Network (GRAN). The GRAN is divided further into a Radio Access Network (RAN) and an InterWorking Unit (IWU). As a rule, there is a separate IWU between each core network 2 to 5 and the RAN, like the IWUs 1 to 4 in the figure. The purpose of an IWU is a connection between a core network and the RAN. Therefore, the IWU contains the necessary adaptations and other possible interworking functions. The interface between the IWU and the CN is core network specific. This makes it possible to develop the core networks and the RAN regardless of each other. For instance, IWU1 can be connected to the Base Station System (BSS) of the GSM network. Correspondingly, IWU2 can be connected to a local exchange of an ISDN, for instance. In addition, FIG. 1 shows service producers SP1, SP2, SP3, SP4 and SP5, connected to a core network CN2.

In FIG. 1, a radio access network RAN comprises a Transport Network (TN), a Radio Network Controller (RNC) and Base Stations BS1, BS2, BS3 and BS4 and their coverage areas C1, C2, C3 and C4. The figure shows also one subscriber terminal, a mobile station MS, for instance. In the network architecture presented, the base stations are connected to a transport network TN, transporting user data to the IWUs and control signalling to the radio network controller RNC. All the intelligence controlling the GRAN is located in the base stations BS and in the radio network controller RNC. As stated before, this control is typically restricted to control functions associated with radio access as well as to establishing connections through a transport network TN. The TN may be an ATM network, for instance. However, it is to be noted that only one possible implementation of the UMTS access network is presented above.

As was mentioned above, the functions of an access network are restricted to radio access functions. Data transmission over the access network occurs then by using low level protocols corresponding for instance to layers 1 and 2 (physical and data connection layer) of the Open Systems Interconnection (OSI) model. In turn, communication between a wireless mobile station and a core network takes place by using higher level communication protocols of the core network. A wireless mobile station may thus contain several different protocols corresponding to the protocols of those core networks with whom it communicates, and it selects among them each time the one corresponding to the core network to be used. The wireless mobile station may also be arranged to load new communications protocols at its disposal automatically.

A problem with the above system is the routing of Protocol Data Units (PDU) according to a higher level protocol from a wireless mobile station to the correct core network and, respectively, from the core network to the protocol stack which corresponds to the core network of the wireless mobile station. Higher level protocol signifies here for instance protocols corresponding to OSI layer 3 (L3, network layer) and higher protocols. In general, protocol discriminators are used for this, their task being to detect the protocol to which the PDU (or message) in question corresponds. However, it is not sensible or even possible to use protocol discriminators in connection with the UMTS system or the like, for the following reasons: Firstly, the protocol discriminators of different types of core networks (for instance GSM, B-ISDN) are not compatible with each other; their information elements can be of unequal length, for instance. Secondly, if two or more core networks of the same type are connected to the access network, they cannot be distinguished from each other on the basis of the protocol discriminator only, because the protocol discriminators are identical.

As an example of the above problem can be mentioned the use of General Packet Radio Service (GSM/GPRS) systems in connection with some 3G ($3^{rd}$ generation) system. Conventionally, these systems have been used in parallel in such a way that, in each system, a communication connection to a mobile station has been arranged via separate routes such that even the radio path has been separate, on account of which no routing problems as described above have occurred. In the future, the systems (or developed versions of them) will probably be used for instance in connection with the UMTS or a similar system in such a way that at least the radio connection is common, i.e. they use the same radio interface. The systems may also be combined to one unit using one protocol, which unit is then connected to the access network. In cases like this, the above problem with routing protocol data units to the correct system turns up.

BRIEF DESCRIPTION OF THE INVENTION

The aim of the invention is thus to develop a method and an apparatus implementing the method in such a way that the above problems can be solved. An object of the invention is a method for the control of communication, in which a terminal device communicates with the opposite end via an access network using low level signalling protocols and via a core network connected to the access network, the core network using high level signalling protocols, whereby one or more core networks are connected to the access network, the invention being characterized in that each core network connected to the access network is given a separate identifier and this identifier is used for routing protocol data units of a high level signalling protocol.

The invention is based on that unambiguous network-specific identifiers are created for core networks connected to an access network and the traffic between a mobile station and a core network is routed by means of identifiers.

An advantage of the method of the invention is that the method enables the use of several existing core network protocols in connection with the UMTS or a similar system without any changes being made in the protocol discriminators of the protocols. Further, the invention enables the use of two or more core networks of the same type in the access network. The invention also offers a flexible possibility of updating the system, because core networks of new type can easily be added in parallel with the existing ones. Additionally, the invention makes it easier to combine wireless systems of cellular and other types.

A further object of the invention is a communication system, comprising at least one terminal device, an access network using low level signalling protocols, one or more core networks connected to the access network, the core networks using high level signalling protocols, whereby the system is characterized in that the system is arranged to give each core network connected to the access network a separate identifier and to use this identifier for routing protocol data units of a high level signalling protocol.

Still another object of the invention is a terminal device communicating with an access network, one or more core networks being connected to the access network and the terminal device comprising separate high level signalling protocol stacks for one or more core networks and common low level signalling protocol layers for all core networks, the terminal device being characterized in that the terminal device comprises identifiers corresponding to the core networks, when the terminal device is arranged to use said identifiers for routing received protocol data units of a high level signalling protocol from low level signalling protocol layers to the correct high level signalling protocol stack.

By means of such a system and such a terminal device, the advantages offered by the method of the invention can be achieved in a simple manner.

BRIEF DESCRIPTION OF FIGURES

Now, the invention will be described in greater detail in connection with preferred embodiments, with reference to the attached drawings, in which.

DETAILED DESCRIPTION OF THE INVENTION

Though the following description of a preferred embodiment of the invention presents the use of the invention in a UMTS system, the intention is not to restrict the invention to any predetermined system, but it can be applied to any wired or wireless communication system, comprising an access network and core networks connected to it. Likewise, the types of the core networks used are not restricted to the ones in the examples, but they may vary. The core networks may be for instance circuit- or packet-switched.

Figure 1:
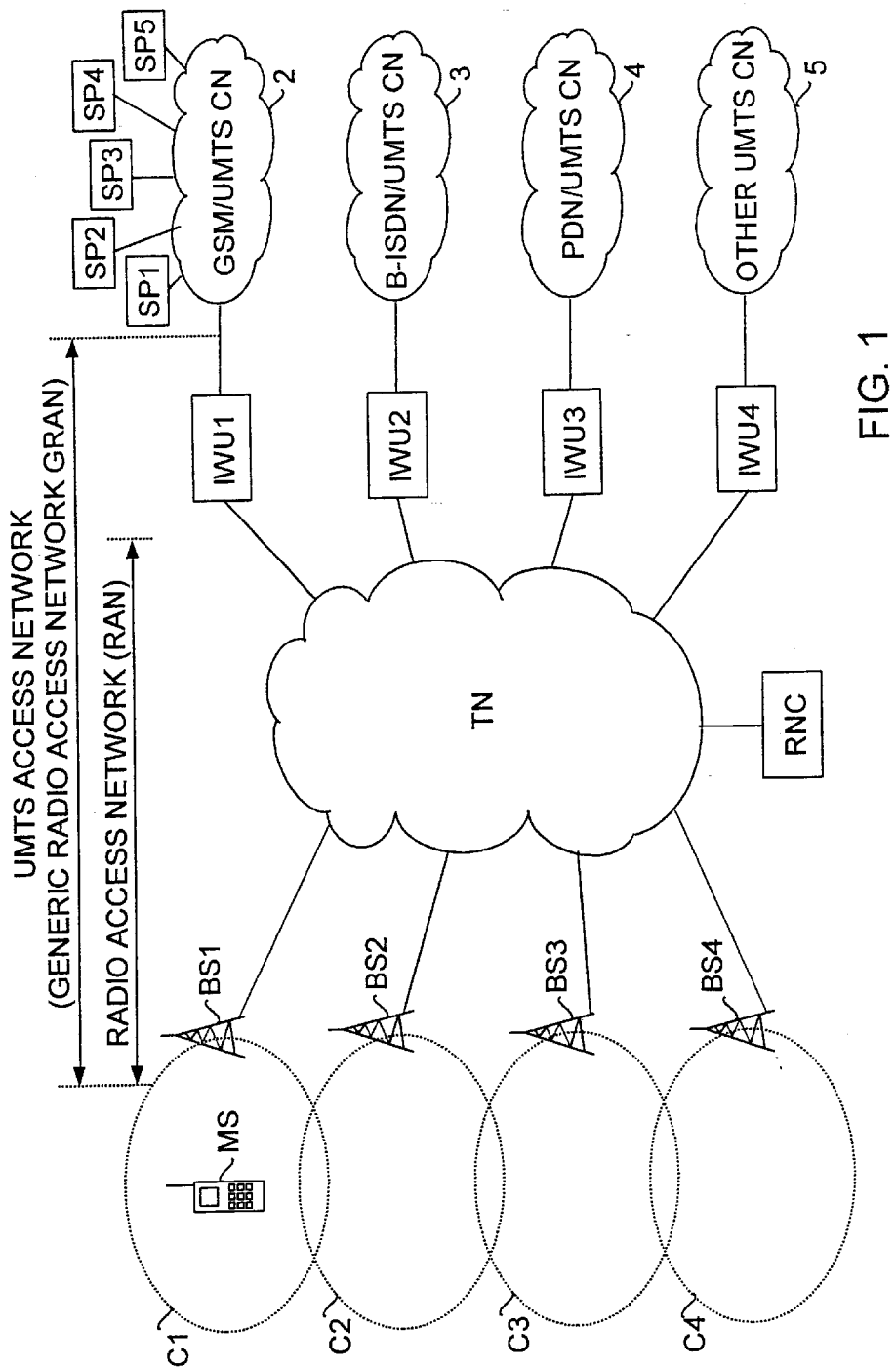
FIG. 1 shows a possible structure of a UMTS access network.
Figures 2, 4:
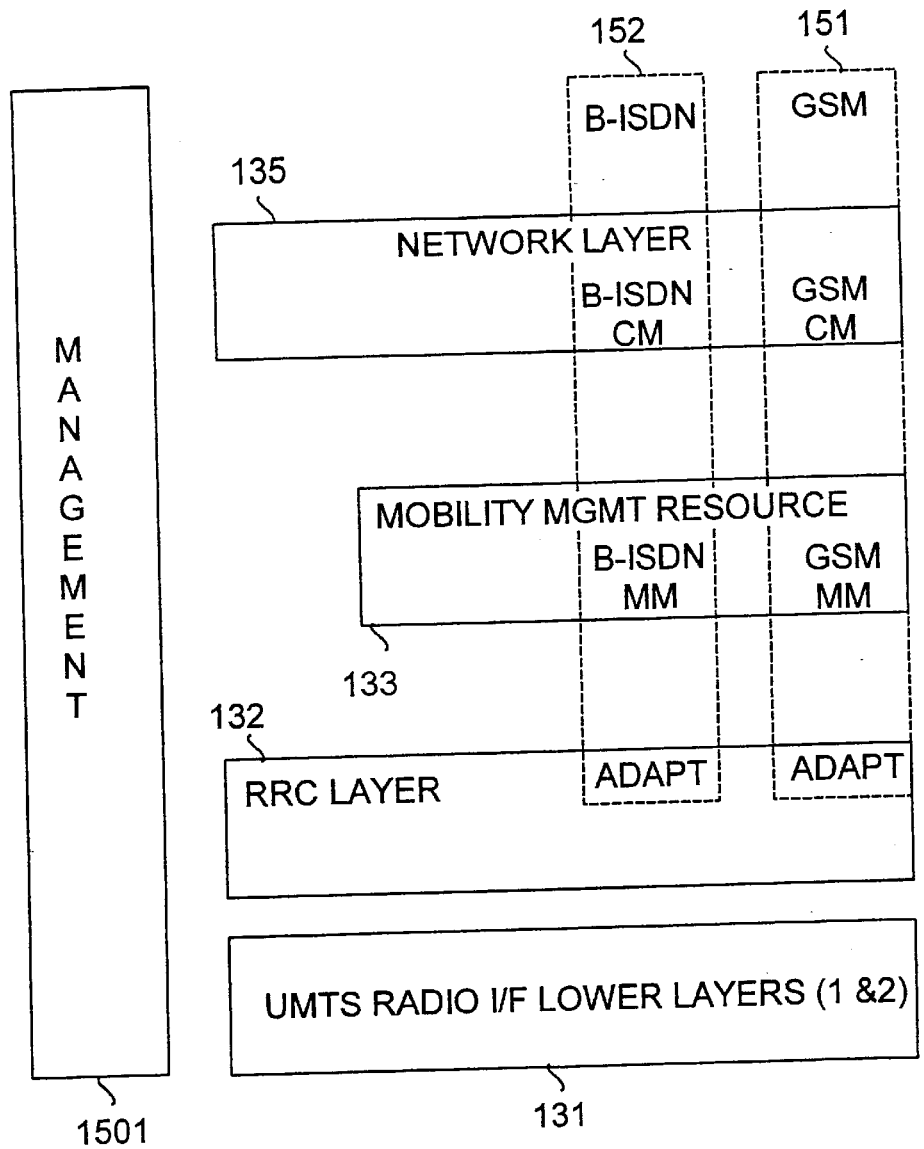
FIG. 2 shows the functional structure of a protocol stack and other communication software in a terminal device in accordance with an embodiment.
FIG. 4 shows a routing table in accordance with an embodiment.

FIG. 2 illustrates the functional structure of a communication software contained in a mobile station MS. Protocol code files 151 and 152, being at least one in number, contain data of the protocols of different core networks. By means of the code files and controlled by a management software 1501, the mobile station receives and transmits data in accordance with the different protocols. In addition, the mobile station uses a code 131 comprising layers 1 and 2 of the radio access system. Further, the figure shows a Radio Resource Control (RRC) layer 132, which may comprise protocols for establishing and managing connections by agreeing on necessary parameters (speed, service quality, etc.) according to the demands of the terminal user and the access network RAN and which performs signal quality measurements and makes handover decisions.

Each protocol code file 151 and 152 comprises a network layer for performing core network specific protocols, a mobility management layer for Mobility Management (MM) and other resource functions, and an adaptation component (adapt) forming a part of the RRC layer 132 and offering the RRC layer a protocol modification, by means of which it may communicate with the mobility management layer of said code file.

So, the GSM protocol code file 151 comprises a Connection Management (GSM CM) layer and a GSM MM layer and an adaptation component. The B-ISDN protocol code file 152 comprises a B-ISDN CC component, a B-ISDN MM component and an adaptation component. Accordingly, each component of each protocol file corresponds to the protocol of a different layer and communicates with higher and lower layers by means of so-called primitives composed of signalling format messages comprising data to be transferred.

Figure 3:
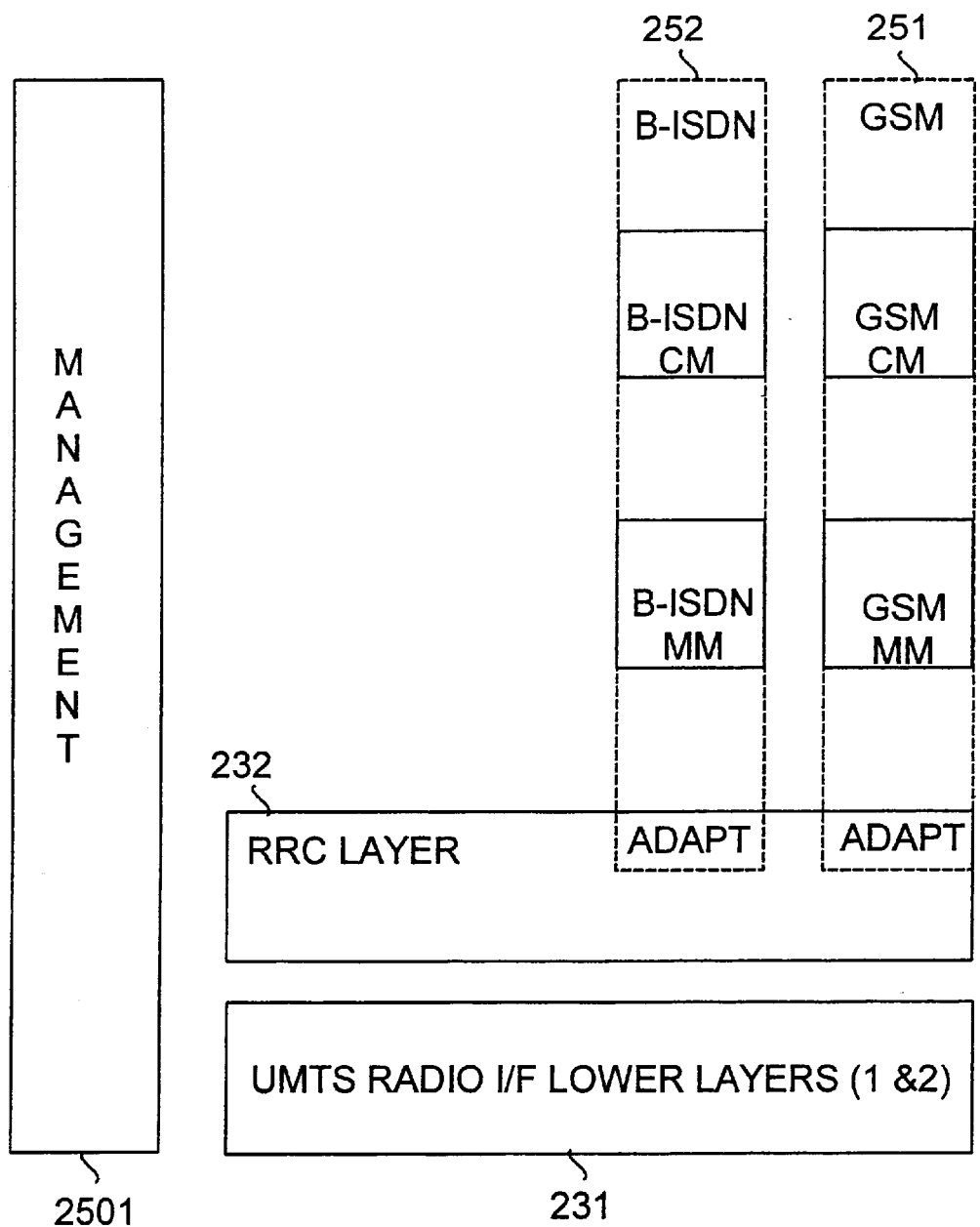
FIG. 3 shows functional parts of the communication software in the access network in accordance with an embodiment.

FIG. 3 shows the corresponding parts in an access network: protocols 231 of lower layers of the radio access and an RRC layer 232. The RRC layer 232 communicates with the RRC layer 132 of a mobile station and comprises adaptation components (IWUs) enabling a communication with a GSM core network and a B-ISDN core network. In addition, a management software 2501 and protocol code files 251 and 252 are illustrated. A protocol adaptation based on the protocol code files takes place in interworking units IWU1 to IWU4, acting as an interface between the access network RAN and the core networks 2 to 5.

The lower radio access layers 131 and 231 communicate with each other via radio access. The RRC layers 132 and 232 communicate with each other via the layers 131 and 231.

In the first phase of the method of the invention, identifiers are created for all core networks 2, 3, 4 and 5 connected to the access network RAN. This may take place in such a way that the access network sends data of the core networks to the mobile stations MS and the core networks are provided with identifiers in this order. The data contain also the country code and the type of core network, for instance. Alternatively, the access network may provide the core networks with identifiers in advance and transmit this identifier as well to the mobile station when transmitting other data of the core networks. The identifiers have to be created either at predetermined intervals or always when changes occur in the core network data, in order to make it possible to connect core networks to and to disconnect them from the access network dynamically so that the data in the mobile stations remain up to date. As assistance can be used for instance a special flag, whose state changes when the core network data change. The data of the core networks can be gathered for example in a table, from which appears the identifier Id, the type, the country code and the network code of each core network. An example of such a routing table is presented in FIG. 4. The form of the table and the data therein may vary without deviating from the basic idea of the invention.

If only one core network of each type is connected to the access network, predetermined network type specific identifiers can be used. Then, the access network does not need to transmit the identifier to the mobile stations when it transmits data of the core networks connected to it, because the identifiers can be concluded from the network types informed.

After the identifiers have been created, a data transmission occurs as follows: protocol layer N+1, i.e. the first core network protocol layer (e.g. GSM++ MM, where ++ signifies a developed version of the GSM MM protocol), desires to establish an RR connection for location updating, for instance. This takes place by using a primitive RR_EST_REQ provided with necessary parameters and/or L3 MM PDU.

The next phase has two alternatives. A mobile station may have one UMTS adaptation layer (UAL) for each core network protocol stack for interpreting its primitives only. The UAL may also be one entity having several logical entities, one for each core network protocol stack. Irrespective of the implementation, the control code interpreting the primitive (such as RR_EST_REQ) searches from the routing table the identifier corresponding to the core network. Correspondingly, the access network may comprise one interworking unit IWU for each core network, comprising one InterWorking Function IWF or one IWU comprising several IWFs, one for each core network. The UAL or IWF forms a new PDU, containing the identifier of the core network and the original L3 CN PDU, and forms an appropriate primitive (for instance RRC_DATA_REQ). The lower layer protocol RRC establishes a connection over the access network to the corresponding protocol and transmits the new PDU to the opposite end. The receiving protocol unit interprets the identifier part of the PDU and routes the whole PDU to the correct IWF/UAL corresponding to the core network of the identifier, or the original L3 CN PDU only, if for instance an IWU comprising only one IWF is concerned, in which case the identifier is not needed any more. This step is not necessary, if the IWU/UAL is one entity consisting of several logical entities. The UAL/IWF interprets the identifier part and transmits the original L3 CN PDU to the correct core network protocol stack. This step is not needed, if for instance only one core network is connected to a physical IWU comprising only one IWF, but for instance in a case when the UAL comprises several core network protocol stacks.

It is obvious to one skilled in the art that, when the technique is developing, the basic idea of the invention can be implemented in many different ways. The invention and its embodiments are thus not restricted to the above examples, but they can vary within the scope of the claims.

What is claimed is:

1. A method for the control of communication, in which a terminal device communicates with the opposite end via an access network using low level signalling protocols and via a core network connected to the access network, the core network using high level signalling protocols, whereby two or more core networks are connected to the same access network, wherein each core network connected to the access network is given a separate identifier and this identifier is used for routing protocol data units according to a high level signalling protocol.

2. A method according to claim 1, wherein the terminal device is a wireless mobile station and the access network is a radio or optical network.

3. A method according to claim 1, wherein the core network specific identifiers are given in the same order as the access network informs the terminal device about the core networks connected to the access network.

4. A method according to claim 1, wherein the access network gives the core networks connected thereto the identifiers and transmits the identifier data to the terminal device.

5. A method according to claim 1, wherein the core networks are given the identifiers in advance as per the network type, if two or more core networks of the same type are not connected to the same access network.

6. A method according to claim 1, wherein data comprising identifier data of the core networks connected to the access network are transmitted to the terminal device either at predetermined intervals or when the data is changed.

7. A method according to claim 1, wherein, when data is transmitted from a terminal device to a core network, the identifier of the core network to be used is added in the terminal device to a protocol data unit of a high level signalling protocol to be transmitted, the protocol data unit provided with the identifier is transmitted via the access network by means of low level signalling protocols, and the protocol data unit is routed to the core network corresponding to the identifier.

8. A method according to claim 1, wherein, when data is transmitted from a core network to a terminal device the identifier of the core network to be used is added at the interface between the core network and the access network to the protocol data unit of a high level signalling protocol to be transmitted, the protocol data unit provided with the identifier is transmitted via the access network by means of low level signalling protocols, and the protocol data unit is routed to the protocol stack of the core network corresponding to the identifier in the terminal device.

9. A communication system, comprising at least one terminal device, an access network using low level signalling protocols, two or more core networks connected to the access network, the core networks using high level signalling protocols, wherein the system is arranged to give each core network connected to the access network a separate identifier and to use this identifier for routing protocol data units of a high level signalling protocol.

10. A communication system according to claim 9, wherein the terminal device is a wireless mobile station and the access network is a radio or optical network.

11. A communication system according to claim 9, wherein the system is arranged to give core network specific identifiers in the same order as the access network informs the terminal device about the core networks connected to the access network.

12. A communication system according to claim 9, wherein the access network forms the identifiers for the core networks connected to the access network and transmits them to the terminal device.

13. A communication system according to claim 9, wherein the system is arranged to use predetermined identifiers for the core networks as per network type, if two or more core networks of the same type are not connected to the same access network.

14. A communication system according to claim 9, wherein the system is arranged to transmit data comprising identifier data of the core networks connected to the access network from the access network to the terminal device either at predetermined intervals or when the data is changed.

15. A communication system according to claim 9, wherein, when data is transmitted from the terminal device to a core network, the system is arranged to add the identifier of the core network to be used in the terminal device to the protocol data unit of a high level signalling protocol to be transmitted, to transmit the protocol data unit provided with the identifier via the access network by means of low level signalling protocols and to route the protocol data unit to the core network corresponding to the identifier.

16. A communication system according to claim 9, wherein, when data is transmitted from a core network to a terminal device, the system is arranged to add at the interface between the core network and the access network the identifier of the core network to be used to a protocol data unit of a high level signalling protocol to be transmitted, to transmit the protocol data unit provided with the identifier via the access network by means of low level signalling protocols, and to route the protocol data unit to the protocol stack corresponding to the core network corresponding to the identifier in the terminal device.

* * * * *

UNITED STATES PATENT AND TRADEMARK OFFICE
CERTIFICATE OF CORRECTION

PATENT NO.    : 6,801,786 B1
DATED         : October 5, 2004
INVENTOR(S)   : Mikko Korpela It is certified that error appears in the above-identified patent and that said Letters Patent is hereby corrected as shown below:

<u>Title page,</u>
Item [22], PCT Filed, replace "May 15, 1999" with -- June 15, 1999 --.

Signed and Sealed this

Second Day of August, 2005

JON W. DUDAS
*Director of the United States Patent and Trademark Office*